United States Patent [19]
Synodis et al.

[11] Patent Number: 5,830,933
[45] Date of Patent: *Nov. 3, 1998

[54] DENTURE ADHESIVE COMPOSITION

[75] Inventors: Joseph Synodis, Summit; Alfred J. Smetana, Wayne; Robert C. Gasman, Montville; Eddie Wong, New Providence, all of N.J.; Hal C. Clarke, Elmont, N.Y.

[73] Assignee: Block Drug Company, Inc., Jersey City, N.J.

[ * ] Notice: The term of this patent shall not extend beyond the expiration date of Pat. No. 5,525,652.

[21] Appl. No.: 635,782

[22] Filed: Apr. 22, 1996

Related U.S. Application Data

[63] Continuation of Ser. No. 288,587, Aug. 10, 1994, abandoned.

[51] Int. Cl.⁶ .......................................................... C08F 8/42
[52] U.S. Cl. ............................ 524/37; 523/105; 523/120; 524/45; 524/549; 524/558; 524/559; 525/327.8; 525/328.9; 525/367; 525/368

[58] Field of Search ..................................... 523/105, 120; 433/180, 217.1; 524/45, 558, 37, 549, 559; 525/327.8, 328.9, 367, 368, 369

[56] References Cited

U.S. PATENT DOCUMENTS

| | | | |
|---|---|---|---|
| 4,373,036 | 2/1983 | Chang et al. | 523/120 |
| 4,758,630 | 7/1988 | Shah et al. | 525/207 |
| 5,006,571 | 4/1991 | Kumar et al. | 523/120 |
| 5,073,604 | 12/1991 | Holeva et al. | 525/327.8 |
| 5,304,616 | 4/1994 | Rajaiah et al. | 526/240 |
| 5,525,652 | 6/1996 | Clarke et al. | 524/37 |

*Primary Examiner*—Marion E. McCamish
*Assistant Examiner*—John J. Guarriello

[57] ABSTRACT

A denture adhesive composition contains a denture adhesive and a pharmacologically acceptable carrier in which the denture adhesive is a salt of a copolymer of maleic acid or anhydride and a 1 to 5 carbon atom alkyl vinyl ether having a specific viscosity of at least 4.0. The denture adhesive composition is used to adhere a denture to the oral mucosa.

27 Claims, No Drawings

DENTURE ADHESIVE COMPOSITION

This is a continuation of application Ser. No. 08/288,587 filed on Aug. 10, 1994 now abandoned.

BACKGROUND OF THE INVENTION

1. Field of the Invention

This invention is directed to adhesives, especially denture adhesives, and to methods of making and using such adhesives.

2. Description of Related Art

Dentures are usually secured in the mouth using creams or powders that have adhesive properties. These denture adhesive compositions serve both to adhere the dentures to the gums and also to provide a cushion and sealant between the gums and the dentures to thereby permit a comfortable fit. The denture adhesives are also required to have acceptable organoleptic qualities. They further need to be sufficiently strong so that a single application of the adhesive is sufficient for a full day's use while not preventing or hindering removal of the dentures at the end of the day for cleaning and the like. The latter requirement has taken on more prominence in recent years since the number of hours of continuous wear which is considered to constitute a "full day" has been increasing.

The technical literature discloses a wide variety of denture adhesive materials. However, most presently available commercial denture adhesives are based on alkyl vinyl ether/ maleic acid or anhydride copolymers. This class of adhesives was set forth as a potential denture adhesive in Germann et al., U.S. Pat. No. 3,003,988, which issued more than 30 years ago. That patent describes synthetic, water sensitized but water insoluble, materials comprising mixed partial salts of lower alkyl vinyl ether-maleic anhydride copolymers for stabilizing dentures. The salts mentioned in the patent are a mixture of (a) calcium and (b) alkalies including sodium, potassium and quaternary ammonium compounds in a 1:1 to 5:1 molar ratio. The calcium and alkali materials are added to the copolymer to form a mixed salt. The use of this class of materials has been described in a variety of other patents. Examples include U.S. Pat. Nos. 4,989,391, 5,037,924, 5,093,387, 4,980,391 and 4,373,036, European Published Patent Application No. 406,643 and WO 92/10988.

These polymers and their salts have not proven to be as fully effective as desired for securing the denture, particularly when the denture wearer consumes hot liquids. Additionally, they have been found susceptible to "washout", a term which refers to the erosion of the adhesive from under the denture during use. As a result, the formulations have provided less than the 12 hours of holding power that denture wearers have begun to demand.

In order to provide additional adhesive and cohesive properties, one approach which has been taken is to manipulate the salt form of the copolymer. Examples can be found in WO 92/22280, WO 92/10988, WO 92/10987 and U.S. Pat. No. 4,758,630 and 5,073,604. Another approach has been to employ an adhesion adjuvant in the formulation or converting the copolymer into a terpolymer, and examples of these approaches can be found in U.S. Pat. No. 3,736,274, 5,037,924 and 5,093,387.

Despite the efforts that have been put into improving the properties of maleic anhydride/alkyl vinyl ether type polymers and their salts, these formulations do not provide the full desired measure of adhesion, cohesion and resistance to washout from beneath the denture.

The copolymer can be made in a variety of molecular weights and an appropriate value is selected depending on the use to which it is going to be put. It is generally recognized that the copolymer of the alkyl vinyl ether and maleic anhydride must have a suitably high molecular weight in order to be suitable for use as a denture adhesive. The minimum molecular weight is frequently indicated as corresponding to a specific viscosity of about 1.2 when measured in a 1% weight/volume solution in methyl ethyl ketone at 25° C.

How high the molecular weight can be in excess of that value is rarely mentioned or considered to be important and the description in WO 92/10988 is a good example of this fact. U.S. Pat. No. 4,373,036 is a rare exception in that it indicates the specific viscosity can be about 1.5–3.5.

The dearth of consideration of molecular weight is understandable both on a theoretical and experimental basis. As molecular weight increases, the solubility of the polymer decreases. The polymer develops its adhesive strength when it is hydrated by the moisture in an individual's saliva and decreased solubility would make the polymer harder to hydrate. Accordingly, the expectation is that as the molecular weight increases, the solubility would decrease to the point where the polymer would no longer function suitably as an adhesive.

On an experimental basis, it has been observed that a copolymer having a specific viscosity of about 3.5 does not have any statistically significant adhesive properties compared to those of a copolymer having a specific viscosity of about 2.6. Since it is more difficult to produce the higher molecular weight polymer, there is no reason to do so. In view of these considerations, it is not surprising that attempts to improve denture adhesive compositions have ignored the molecular weight the polymer. Surprisingly, it has now been found that when the molecular weight is sufficiently high, a superior denture adhesive is achieved.

It is the object of this invention to provide an improved denture adhesive composition having both strong adhesive properties and good washout resistance to provide long holding properties. This and other objects of the invention will become apparent to those of ordinary skill in this art from the following detailed description.

SUMMARY OF THE INVENTION

The invention relates to an improved denture adhesive composition comprising of a denture adhesive and a carrier therefor. More particularly, the improved composition employs a denture adhesive which is a salt of copolymer of maleic anhydride and an alkyl vinyl ether having a specific viscosity of at least about 4. The improvement in a method of adhering a denture to the oral mucosa resulting from the use of the new composition is also a part of this invention.

DESCRIPTION OF THE INVENTION

The denture adhesive composition of the present invention contains a denture adhesive effective amount of a denture adhesive and a pharmacologically acceptable carrier therefor. The denture adhesive usually comprises from about 15% to about 55% by weight of the denture adhesive composition. Preferably it is from about 17% to about 48% by weight and most preferably about 30% in a cream formula and about 50% in a powder formula. The denture adhesive employed in the composition is a salt of a copolymer of maleic acid or maleic anhydride and an alkyl vinyl ether in which the alkyl group has 1 to about 5 carbon atoms. The preferred copolymer is a copolymer of maleic anhydride and methyl vinyl ether. The polymer can be produced by any of the methods which are described in the technical literature or it can be purchased commercially. However, in accordance with the present invention, the copolymer has a molecular weight, as represented by the specific viscosity measured as a 1% weight/volume solution of methyl ethyl ketone at 25° C., of at least about 4. More preferably, the specific viscosity is at least about 4.5.

The copolymer is employed in the form of a metal salt. Those salts where only a portion of the acid groups have been reacted, i.e. which are partially neutralized, are preferred. The preferred alkaline cations include sodium, zinc, potassium, calcium and magnesium. Preferably the salts are mixed salts of calcium/sodium or calcium/potassium, and most preferably they are partial zinc/magnesium salts and sodium/zinc/magnesium salts. Examples of these magnesium salts are found in U.S. patent application Ser. No. 08/288,586, now U.S. Pat. No. 5,525,652 filed concurrently herewith. That application is entitled "Denture Adhesive" and lists Clarke, Ahn, Wong, Gasman, Smetana and Synodis as inventors. The disclosure of that application is hereby incorporated by reference. Even though the salts of that application are preferred, this invention is not limited to salts disclosed that application.

When the salt is prepared, the metal compounds used react with the carboxylic acid groups on the copolymer and neutralize them. Preferably less than 100% of the carboxylic acid groups on the copolymer chain are neutralized. More preferably, the metal compounds neutralize from about 50% to about 90% of the carboxylic acid groups of the copolymer and most preferably from about 65% to about 75% of the carboxylic acid groups.

One of the particular advantages of this invention is that the use of the copolymer having a specific viscosity of at least about 4 permits one to employ a lower degree of neutralization in order to achieve a given level of denture adhesive performance. This means that the necessary minimum cohesion strength for good denture adhesive performance can be achieved by neutralizing less of the acid groups when the molecular weight of the copolymer is such that the specific viscosity of the copolymer is high. The use of a lower degree of neutralization has its own advantages. As a result of the lower concentration of metal cation, the fully hydrated polymer salt is a softer (lower glass transition temperature) adhesive and, in addition, there is a higher concentration of unreacted carboxyl groups. Polymers containing non-neutralized, free carboxyl groups are expected to adhere better through hydrogen bonding to the functional carbonyl groups present in the acrylic plastic of the denture and to the oral mucosa than carboxylate anions present in an alkaline adhesive containing more metal cations. Still further, the higher molecular weight and reduced degree of neutralization also reduce the tendency toward adhesive washout from between the denture and the oral mucous. The copolymer salt of this invention is made by dissolving the copolymer in a suitable solvent such as water. An elevated temperature can be used to expedite the dissolution of the polymer in the solvent as long as the temperature is not so high as to deleteriously affect the polymer. Separately, a dispersion of the metal compound in water may be prepared. Preferably the metal compound solution also includes a catalyst, such as a Lewis acid or base, to facilitate the partial reaction of the metal compound with the carboxyl hydrogen in the copolymer.

In choosing the alkaline, inorganic metal compound used to neutralize the carboxylic acid groups, the anion portion of the compound is not restricted, although it is preferably an oxide, hydroxide, carbonate or halide. Of the halides, chlorides are most preferred. In general, the oxides or hydroxides are preferred because of their ease of handling, availability and the generally innocuous nature of the by-products formed in their reaction with carboxylic acids.

After the polymer solution has cooled sufficiently (when heated), the solution or dispersion of metal compound and the polymer solution are combined and allowed to react. The product salt formed is dried, preferably milled to less than about 100 mesh and then dispersed in a pharmacologically acceptable carrier to form the denture adhesive of this invention using techniques well known in the art.

In addition to the denture adhesive, the composition contains a pharmacologically acceptably carrier. The pharmacologically acceptable carrier contains conventional materials and if desired, can contain any adhesive adjuvants which have heretofore been used. For instance, the carrier may contain a carboxymethyl cellulose gum which is used for sensitizing the adhesive to moisture and enhancing the cohesive properties of the formulation and improving gel strength.

Carboxyethyl cellulose and carboxypropyl cellulose materials may also be used. When present, the cellulose gum preferably comprises from about 10% to about 30% by weight of the denture adhesive composition, more preferably from about 15% to about 25% and most preferably from about 20% to about 22% of the composition for a cream formula. In a powder formula, the cellulose gum preferably comprises from about 45% to about 55% of the composition. The cellulose may be present in the form of a full or partial salt, preferably a sodium salt.

Non-active ingredients that may be present in the carrier portion of the denture adhesive composition include thickening agents such as petrolatum, waxes, mineral oil and other oils; flavors such as synthetic flavor oils and/or oils derived from plants and fruits; colors suitable for food, drug and cosmetic use and known as FD&C colors; preservatives such as the parabens, benzoic acid and benzoates and the like; viscosity modifiers; and non-toxic anti-caking agents such as silica, magnesium stearate and talc.

In a cream formulation, the mineral oil or the like preferably comprises from about 10% to about 35%, preferably from about 12% to about 17% by weight of the composition, and petrolatum and the like preferably comprise from about 20% to about 50%, preferably from about 25% to about 45% by weight of the composition.

In order to further illustrate the present invention, various examples are set forth below. In these, as throughout the specification and claims, all parts and percentages are by weight and all temperature in degree centigrade unless otherwise indicated.

EXAMPLE 1

A series of partially neutralized mixed salts of methyl vinyl ether/maleic anhydride copolymer are prepared as follows. 3.25 Kilograms of distilled water are heated in a stirred reaction vessel to about 90° C., 253 grams of methyl vinyl ether/maleic anhydride copolymer are added slowly and mixing continued until a clear solution is obtained. The solution is then cooled to 65°–75° C.

Separately, 84 grams of calcium hydroxide and 13 grams of sodium hydroxide dispersion in 500 grams of water is prepared. When the temperature of the copolymer solution has reached 65°–75° C., the dispersion is added while mixing at high speed to prevent a localized reaction. Mixing is continued for 15 minutes after addition of the metal-containing dispersion is complete and the reaction mixture is then transferred to a series of shallow steel drying trays which are placed in a hot air convection oven at about 75° C. for 18–20 hours. The dry partial salt is then milled and screened through a 100 mesh screen.

EXAMPLE 2

3.25 Kilograms of distilled water are heated in a stirred reaction vessel to about 90° C. 257 Grams of methyl vinyl ether/maleic anhydride copolymer are added slowly and mixing continued until a clear solution is obtained. The solution is then cooled to 65°–75° C.

Separately, 79.4 grams of calcium hydroxide and 13.2 grams of sodium hydroxide dispersion in 500 grams of water is prepared. When the temperature of the copolymer solution has reached 65°–75° C., the dispersion is added while mixing at high speed to prevent a localized reaction. Mixing is continued for 15 minutes after addition of the metal-containing dispersion is complete and the reaction mixture is then transferred to a series of shallow steel drying trays which are placed in a hot air convection oven at about 75° C. for 18–20 hours. The dry partial salt is then milled and screened through a 100 mesh screen.

EXAMPLE 3

3.25 Kilograms of distilled water are heated in a stirred reaction vessel to about 90° C. 262 Grams of methyl vinyl ether/maleic anhydride copolymer are added slowly and mixing continued until a clear solution is obtained. The solution is then cooled to 65°–75° C. Separately, 74.6 grams of calcium hydroxide and 13.4 grams of sodium hydroxide dispersion in 500 grams of water is prepared. When the temperature of the copolymer solution has reached 65°–75° C., the dispersion is added while mixing at high speed to prevent a localized reaction. Mixing is continued for 15 minutes after addition of the metal-containing dispersion is complete and the reaction mixture is then transferred to a series of shallow steel drying trays which are placed in a hot air convection oven at about 75° C. for 18–20 hours. The dry partial salt is then milled and screened through a 100 mesh screen.

EXAMPLE 4

3.25 Kilograms of distilled water are heated in a stirred reaction vessel to about 90° C. 266.7 Grams of methyl vinyl ether/maleic anhydride copolymer are added slowly and mixing continued until a clear solution is obtained. The solution is then cooled to 65°–75° C.

Separately, 69.6 grams of calcium hydroxide and 13.7 grams of sodium hydroxide dispersion in 500 grams of water is prepared. When the temperature of the copolymer solution has reached 65°–75° C., the dispersion is added while mixing at high speed to prevent a localized reaction. Mixing is continued for 15 minutes after addition of the metal-containing dispersion is complete and the reaction mixture is then transferred to a series of shallow steel drying trays which are placed in a hot air convection oven at about 75° C. for 18–20 hours. The dry partial salt is then milled and screened through a 100 mesh screen.

The table set forth below indicates the metal hydroxide used to form the dispersion and the percent of the carboxylic acid groups neutralized in the polymer produced.

| Example | Metal Compound | % Neutralized |
| --- | --- | --- |
| 1 | Sodium hydroxide/calcium hydroxide | 45 |
| 2 | Sodium hydroxide/calcium hydroxide | 30 |
| 3 | Sodium hydroxide/calcium hydroxide | 60 |
| 4 | Sodium hydroxide/calcium hydroxide | 80 |

EXAMPLES 5–8

A series of denture adhesive creams are prepared using the salts of Example 1. The respective salts are blended with the other ingredients in the following manner.

Mineral oil (about 17 parts) is heated to a temperature of about 75° C. Petrolatum (about 28 parts) is heated to the same temperature and is added to the mineral oil and blended until a uniform consistency is reached. Sodium carboxymethyl cellulose (about 24 parts), colorant (0.05 part), anti-caking agent, preservative (0.05 part) and flavor (0.4 part) are added while the mixture is slowly cooled to about 50° C. The partial mixed salt of the copolymer is then added at about 50° C. and the resulting denture adhesive cream is cooled to room temperature.

EXAMPLES 9–11

Adhesive shear strength was measured employing three homogeneously mixed samples of adhesive formulations of Examples 5–8 and water in weight ratios of 1:1, 1:0.75 and 1:0.5. Each combination was spread on an about 2.54 cm square area of a transparent acrylic slide and then a second slide having a 1.9 cm diameter hole in one end was placed over the first slide. The resulting sandwich was held under about 20 lb (9 kg) pressure for 5 seconds and then set aside for about 5 minutes to allow hydration to occur. Pressure (about 20 lb–9 kg) was again applied for 5 seconds and then the shear strength was measured using an Instron Model 1122 machine. The results of the measurements were averaged. It was noted that a 75% sodium/calcium partial mixed salt of methyl vinyl ether/maleic anhydride copolymer (specific viscosity 4.7) had a better shear strength than a 75% sodium/calcium mixed partial salt of the copolymer having a specific viscosity of either 3.5 or 2.6.

EXAMPLES 12–15

Denture adhesive paste formulations containing a 75% sodium/calcium partial salt of a methyl vinyl ether/maleic anhydride copolymer using the following ingredients: sodium carboxymethyl cellulose (about 24 parts), petrolatum (about 28 parts), mineral oil (about 17 parts), colorant (about 0.05 parts) and preservative (about 0.05 parts).

Pastes in which the copolymer (before salt formation) had a specific viscosity of either 2.6, 3.5 or 4.7 were evaluated by a panel of denture users. The pastes where the copolymer had a specific viscosity of 2.6 or 3.5 were perceived to be equivalent while the paste in which the specific viscosity was 4.7 was noted to exhibit a longer and stronger hold.

EXAMPLES 16–18

Denture adhesive powders were prepared using sodium/calcium partial salts produced in example 4. The respective salts were dry blended with an equal weight of sodium carboxymethyl cellulose. The powders were then evaluated by a panel of denture wearers.

No statistically significant differences were noted in this testing between the partial salts when the methyl vinyl ether/maleic anhydride copolymer had a specific viscosity of either 2.6 or 3.5. However, when the copolymer partial salt had been made from the copolymer having a specific viscosity of 4.7, a statistically significant improvement adhesive performance was noted. The high molecular weight salt was noted to have a longer hold and a stronger hold than the lower molecular weight products.

The various embodiments which have been described in this application were set forth for the purpose of further illustrating the invention and were not intended to limit it. Various changes and modifications can be made from those embodiments without departing from the spirit and scope of the invention.

What is claimed is:

1. A denture adhesive composition comprising a pharmacologically acceptable carrier and an effective adhesion amount of a salt of a copolymer of maleic acid or anhydride and a 1 to 5 carbon atom alkyl vinyl ether, wherein said salt has a specific viscosity of at least about 4.0.

2. The denture adhesive of claim 1, in which the specific viscosity is at least about 4.5.

3. The denture adhesive composition of claim 2, in which the carboxylic acid groups of said copolymer are not completely neutralized.

4. The denture adhesive composition of claim 3, in which the alkyl moiety is methyl.

5. The denture adhesive composition of claim 4, in which the salt cation comprises a metal selected from Groups IA, IIA and IIB of the Periodic Table.

6. The denture adhesive composition of claim 4, in which the salt cation is selected from the group consisting of sodium, potassium, calcium, zinc, magnesium or mixtures thereof.

7. The denture adhesive composition of claim 6, in the form of a cream.

8. The denture adhesive composition of claim 7, in which the denture adhesive is a mixed sodium/calcium salt of the copolymer of maleic anhydride and methyl vinyl ether and the amount thereof is from about 15% to about 55%.

9. The denture adhesive composition of claim 6, in the form of a powder.

10. The denture adhesive composition of claim 9 in which the denture adhesive is a mixed salt of the copolymer of maleic anhydride and methyl vinyl ether and the amount thereof is from about 15% to about 55%.

11. The denture adhesive composition of claim 1 in which the carboxylic acid groups of said copolymer are not completely neutralized.

12. The denture adhesive composition of claim 1 in which the alkyl moiety is methyl.

13. The denture adhesive composition of claim 1 in which the salt cation comprises an alkali metal.

14. The denture adhesive composition of claim 1 in which the salt cation is selected from the group consisting of sodium, potassium, calcium, zinc, magnesium or mixtures thereof.

15. The denture adhesive composition of claim 1 in which the amount of denture adhesive is from about 17% to about 48%.

16. The denture adhesive composition of claim 1 in the form of a cream.

17. The denture adhesive composition of claim 16 in which the amount of denture adhesive is about 30%.

18. The denture adhesive composition of claim 1 in the form of a powder.

19. The denture adhesive composition of claim 18 in which the amount of denture adhesive is about 50%.

20. The denture adhesive composition of claim 1 containing from about 10% to about 30% of a carboxymethyl cellulose gum.

21. The denture adhesive composition of claim 20 wherein the gum is sodium carboxymethyl cellulose and the amount thereof is about 15–53%.

22. A method of adhering a denture to the oval mucosa by employing a denture adhesive composition utilizing the denture adhesive composition of claim 1.

23. A method of adhering a denture to the oval mucosa by employing a denture adhesive composition utilizing the denture adhesive composition of claim 2.

24. A method of adhering a denture to the oval mucosa by employing a denture adhesive composition utilizing the denture adhesive composition of claim 3.

25. A method of adhering a denture to the oval mucosa by employing a denture adhesive composition utilizing the denture adhesive composition of claim 8.

26. A method of adhering a denture to the oval mucosa by employing a denture adhesive composition utilizing the denture adhesive composition of claim 10.

27. A method of adhering a denture to the oval mucosa by employing a denture adhesive composition utilizing the denture adhesive composition of claim 20.

* * * * *